US005477740A

United States Patent [19]
Shioya et al.

[11] Patent Number: 5,477,740
[45] Date of Patent: Dec. 26, 1995

[54] POWER TRAIN TEST SYSTEM

[75] Inventors: Yoshitomo Shioya; Hiroshi Terada; Saburo Ozawa, all of Tokyo, Japan

[73] Assignee: Kabushiki Kaisha Meidensha, Tokyo, Japan

[21] Appl. No.: 296,420

[22] Filed: Aug. 26, 1994

[30] Foreign Application Priority Data

Aug. 26, 1993 [JP] Japan .................................. 5-210798

[51] Int. Cl.$^6$ ............................................... G01L 3/02
[52] U.S. Cl. ........................... 73/862.191; 73/118.1; 73/162; 475/225
[58] Field of Search ..................... 73/862.19, 118.1, 73/162; 475/220, 222, 225

[56] References Cited

U.S. PATENT DOCUMENTS

| | | | |
|---|---|---|---|
| 3,739,632 | 6/1973 | Miller et al. | 73/136 |
| 3,942,363 | 3/1976 | Swis et al. | 73/116 |
| 3,944,143 | 3/1976 | O'Reilly et al. | 239/650 |
| 4,159,642 | 7/1979 | Hudson et al. | 73/118 |

OTHER PUBLICATIONS

"Meiden Jiho", 1979, No. 6, pp. 30–32.

*Primary Examiner*—Richard Chilcot
*Assistant Examiner*—Jewel V. Artis
*Attorney, Agent, or Firm*—Foley & Lardner

[57] ABSTRACT

A system for testing a power train assembly such as a transaxle of a vehicle has first and second gear units each having separate input members for receiving input torque from the power train assembly to be tested, a mounting member for supporting the power train assembly between the first and second gear units, a drive motor for supplying input torque to the power train assembly, and a dynamometer connected with the second gear unit. The drive motor is connected with the input member of the power train assembly by a driving shaft passing through the first gear unit. Preferably, the first and second gear units are connected by at least one interconnecting shaft extending under the power train assembly. With this arrangement, the test system is smaller in required space, smaller in inertia, capable of high speed testing, and readily applicable to different types of power train assemblies.

17 Claims, 8 Drawing Sheets

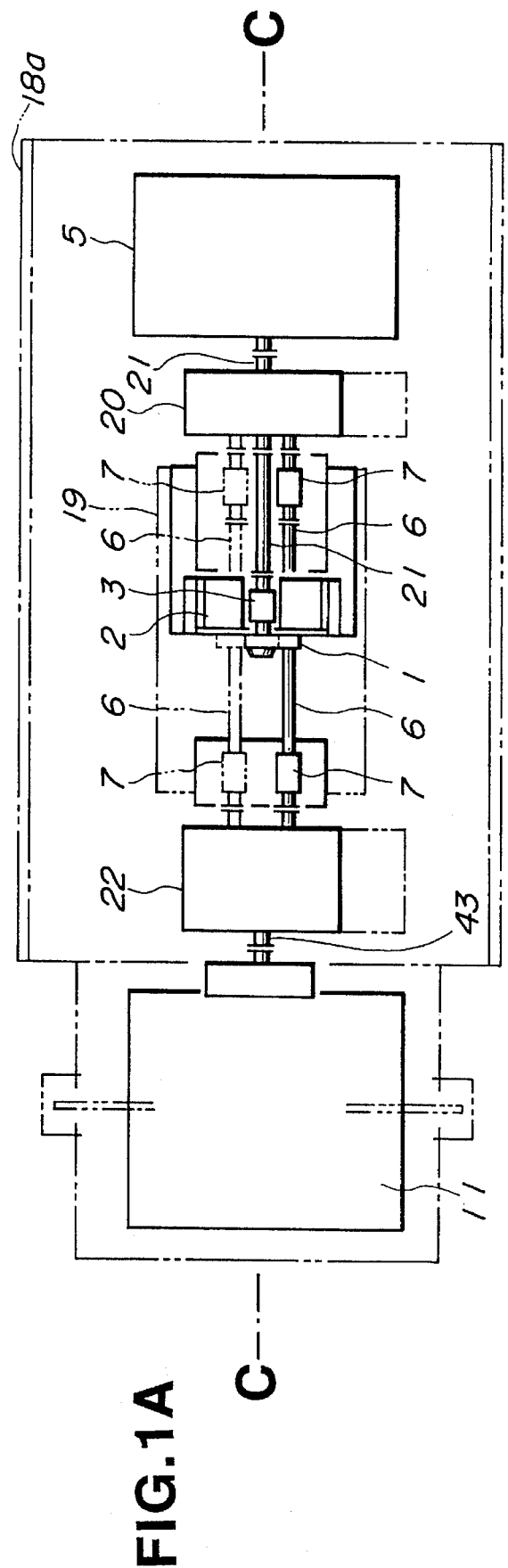
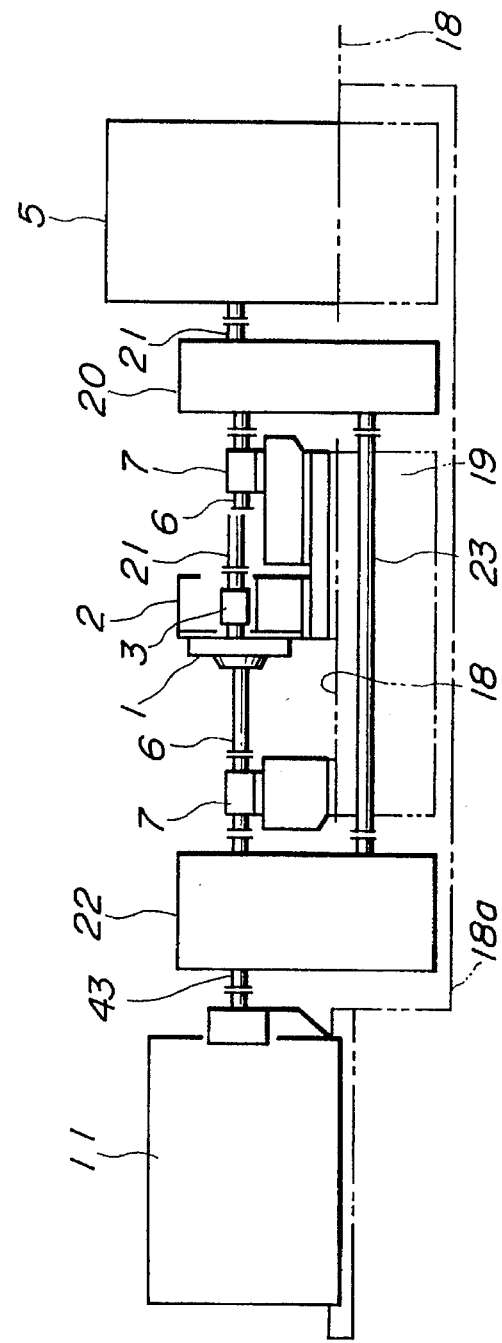
FIG.1A
FIG.1B

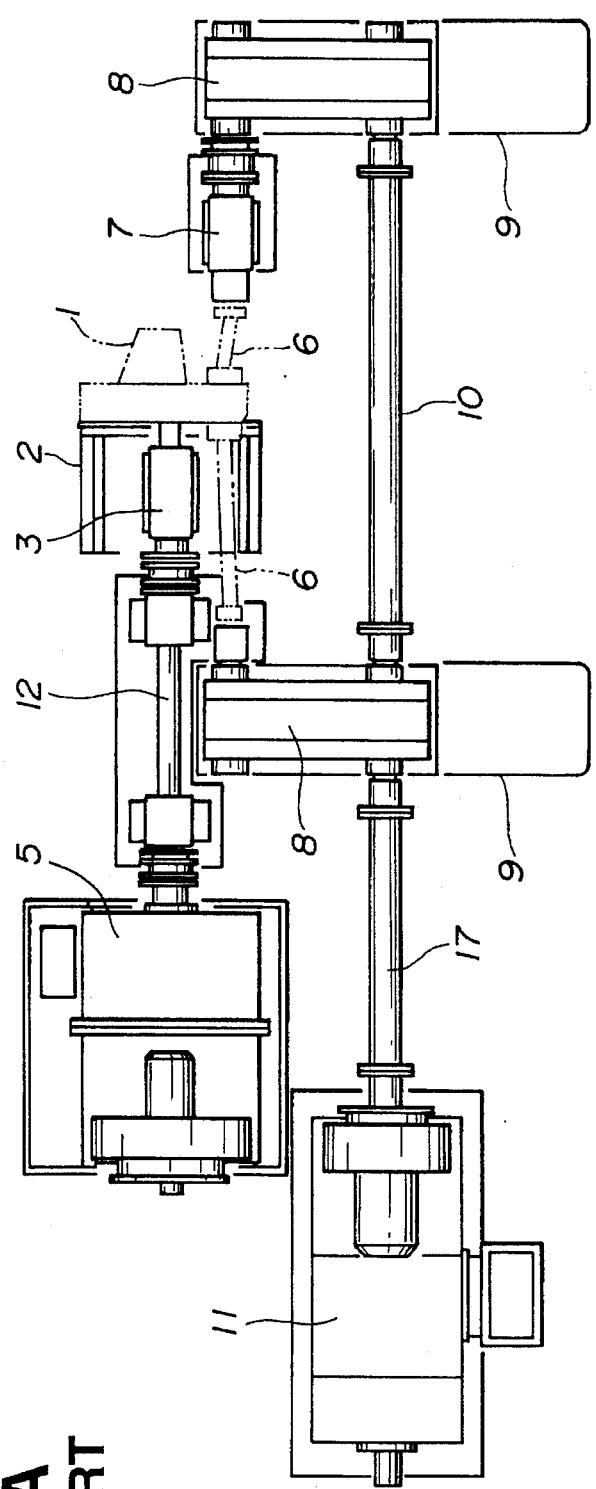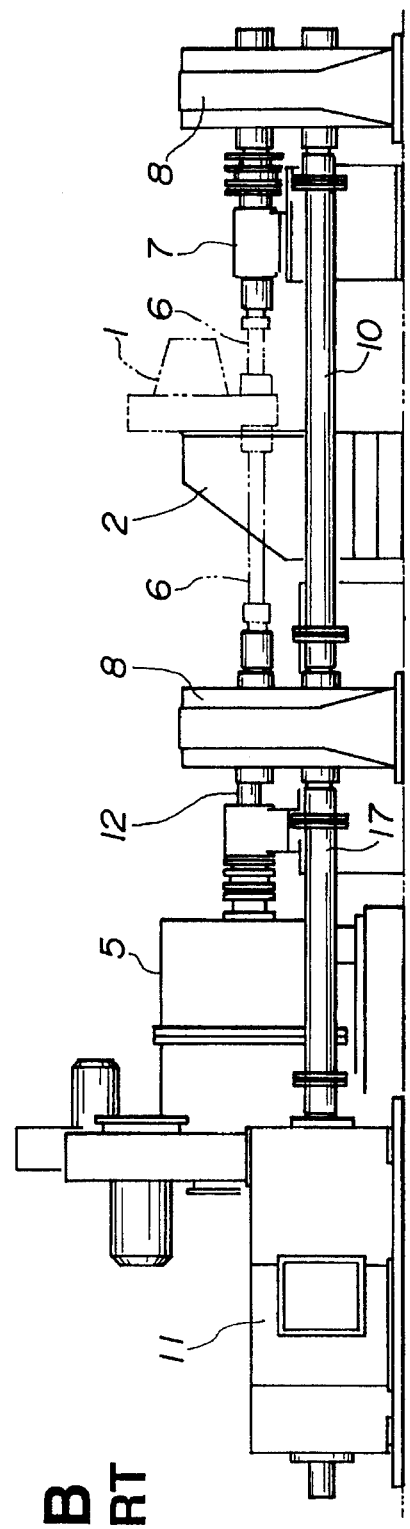
FIG.7A PRIOR ART
FIG.7B PRIOR ART

POWER TRAIN TEST SYSTEM

BACKGROUND OF THE INVENTION

The present invention relates to test equipment for testing a power train (such as a transmission or a transaxle) of a vehicle.

FIG. 6 shows a first conventional test system having a mounting stand 2 supporting a test unit (a transaxle) 1 to be tested, a torque meter 3 connected with the input side of the test unit 1, a gear mechanism 4 equipped with a lubricating system and connected with the torque member 3, a drive motor 5 connected with the gear mechanism 4, two torque meters 7 connected, respectively, with two output shafts of the test unit 1, a pair of gear mechanisms connected, respectively, with the torque meters 7, a pair of lubricating units for lubricating the gear mechanisms 8, a shaft 10 for connecting the gear mechanisms 8 so that the speeds of both gear mechanisms are held equal to each other, and a dynamometer (generator) 11 connected with one of the gear mechanisms 8.

In this test system, the test unit 1 is driven by the drive motor 5 through the gear mechanism 4 and the torque meter 3. The rotation of the test unit 1 is transmitted through the output shafts 6 to the gear mechanisms 8 rotating at an equal speed, and the dynamometer 11 absorbs the mechanical power. In this way, the torque and rotational speed are measured and controlled.

FIGS. 7A and 7B show a second conventional test system which has a drive motor 5 connected, through a torque meter 3 and a connecting shaft 12, with the input side of a test unit 1 to be tested, a right gear mechanism 8 connected through a torque meters 7 with a right output shaft 6 of the test unit 1, a left gear mechanism 8 connected with a left output shaft 6 of the test unit, a connecting shaft 10 connecting the left and right gear mechanisms 8, and a dynamometer 11 connected through a connecting shaft 17 with the left gear mechanism 8. This test system is operated in the same manner as the first conventional system shown in FIG. 6.

FIGS. 8A and 8B show a third conventional test system in which the input shaft of a test unit 1 is connected through a torque meter 3 and a speed change mechanism 13 with a drive motor 5, and the left and right output shafts 6 of the test unit 1 are connected with left and right dynamometers 11, respectively.

FIG. 9 shows a fourth conventional test system in which a test unit 1 is attached to one of left and right mounting stands 2, and rotation of a drive motor 5 is supplied to the test unit 1 from the left or right side. A right torque meter 7 and a right gear mechanism 8 are mounted on a right movable bed 14, and a left torque meter 7, a left gear mechanism 8 and a dynamometer 11 are mounted on a left movable bed 15. The beds 14 and 15 are movable left and right as shown in arrows in FIG. 9. Therefore, the left and right output shafts 6 of the test unit 1 can be connected, respectively, with the left and right gear mechanism 8 through the torque meters 7 whether the test unit 1 is attached to the left stand 2 or the right stand 2. The drive motor 5 can be connected in a different direction as shown in a two dot chain line in FIG. 9.

FIG. 10 shows a fifth conventional test system. This system also has left and right mounting stands 2, but left and right torque meters 7, left and right gear mechanisms 8 and a dynamometer 11 are all fixed. There is provided a connecting shaft 16 for allowing connection between the left and right output shafts 6 of a test unit and the left and right torque meters 7 both when the test unit is attached to the left stand 2 and when the test unit 1 is attached to the right stand 2.

FIG. 11 shows a sixth conventional test system which can test power trains of both a right side engine driven type having an input member on the right side and a left side engine driven type having an input member on the left side. This test system includes a single drive motor 5 on the input side of the test unit, and two right-side gear units 8 connected, respectively, through two connecting shafts 10 with a left-side gear unit 8.

FIG. 12 shows a seventh conventional test system applicable to the right side engine driven type and the left side engine driven type. This system has two drive motors 5 and two torque meters 3 on the input side of the test unit.

In the first, second and third conventional systems shown in FIGS. 6, 7 and 8, it is necessary to change the positions of the drive motor 5, the gear mechanisms 8 and the dynamometer 11 in order to test power trains of both right side driven type and left side driven type, and accordingly, a large space is required. Moreover, the long connecting shaft 10 increases the inertia (or the moment of inertia), and the angle of the output shafts 6 is increased, so that these systems are not adequate for high speed testing. In the case of the fourth conventional system shown in FIG. 9 having the structure of the movable beds 14 and 15, the angle of the output shafts 6 is increased so that the high speed testing is difficult, a large space is required, and an aligning operation of the movable beds 14 and 15 is troublesome.

In the fifth system shown in FIG. 10, the left and right gear units 8 are widely spaced, so that this system requires a wide space and the long connecting shaft 10. Beside, the operation for moving the shaft 16 is troublesome. In the sixth conventional system shown in FIG. 11, the two right-side gear units 8 requires a wide space and increases the mechanical loss and the inertia. The seventh system shown in FIG. 12 requires the two drive motors 5, and the large gear units 8.

SUMMARY OF THE INVENTION

It is therefore an object of the present invention to provide a test system which is smaller in occupied space, advantageous in inertia, and adequate for high speed testing.

According to the present invention, a power train test system is provided for testing a vehicular power train assembly, such as a transaxle of a motor vehicle, having at least an input member and a first output member which are located on one side of the assembly, and a second output member located on the other side. The test system according to the present invention comprises:

a drive motor for supplying a driving torque to the power train assembly;

a driving shaft for transmitting the driving torque from the drive motor to the input member (such as an input shaft) of the power train assembly;

at least one (first) interconnecting shaft;

a dynamometer for receiving a torque from the drive motor through the power train assembly; and a pair of a first gear unit for receiving a torque from the first output member of the power train assembly through one of first and second input members of the first gear unit and a second gear unit for receiving a torque from the second output member of the power train assembly through one of first and second input members of the second gear unit. The first and second gear units are connected with each other by the interconnecting shaft, and the second gear unit is connected with the dynamometer. The driving shaft passes through the first gear unit. Preferably, the interconnecting shaft extends under the power train assembly.

BRIEF DESCRIPTION OF THE DRAWINGS

FIG. 1A is a plan view showing a test system according to a first embodiment of the present invention.

FIG. 1B is a front elevation of the test system sown in FIG. 1A.

FIGS. 7A and 7B are plan and front views showing a second conventional test system.

DETAILED DESCRIPTION OF THE INVENTION

Figure 2:
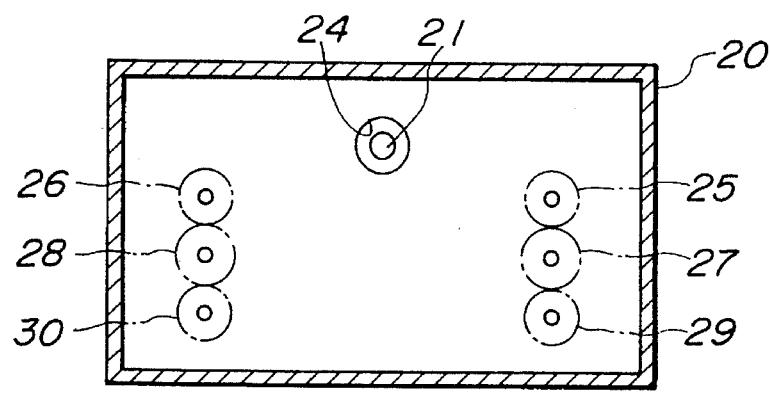
FIG. 2 is a vertical sectional front view of a first gear unit used in the test system shown in FIGS. 1A and 1B.

FIGS. 1A and 1B show a test system according to a first embodiment of the present invention.

A power train test system shown in FIGS. 1A and 1B includes a support base structure defining a floor surface (first surface) 18 and a depression 18a formed in the floor surface 18 and depressed below the floor surface 18. The depression 18a has a substantially flat and horizontal bottom surface (second surface) which is depressed below the floor surface which is substantially horizontal. A bed 19 is provided in the depression 18a. The bed 19 is placed on the bottom of the depression 18a, and has a top surface which is substantially even with the floor surface. A mounting member 2 is placed on the top surface of the bed 19. The mounting member 2 can support a test unit 1 to be tested. The test unit is a power train (or drive train) assembly of a vehicle, which may be a right side drive type transaxle having an input member on the right side, or a left side drive type transaxle having an input member on the left side. The power train assembly has an input member and a first output member which are located on one side of the power train assembly, and a second output member which is located on the opposite side of the assembly. In this example, the input member and the first and second output members are an input shaft and first and second output shafts, respectively.

A drive motor 5 is installed in the depression 18a, and is connected with the input shaft of the test unit 1 through a first shaft torque meter 3 by a driving shaft 21. First and second gear units (mechanisms) 20 and 22 are connected, respectively, with the first and second output shafts 6 of the test unit 1 through second and third shaft torque meters 7. The second gear unit 22 is connected with a dynamometer (generator) 11. The first and second gear units 20 and 22 are connected with each other by a pair of first and second interconnecting shafts 23 so that both gear units are rotated at an equal speed. Each gear unit has a speed increasing gear system.

In this way, the input shaft of the test unit 1 is connected with the driving shaft 21 through a first coupling means. The first output shaft is connected with the first gear unit 20 through a second coupling means, and the second output shaft is connected with the second gear unit 22 through a third coupling means. Each coupling means comprises at least one device for joining two rotating shafts temporarily placed end to end so as to transmit torque therebetween.

The first and second gear units 20 and 22 stand upright in the depression 18a. The bed 19, the mounting member 2 and the test unit 1 supported at a predetermined test position by the mounting member 2 are placed between the first and second gear units 20 and 22. The first and second interconnecting shafts 23 extend below the floor surface 18 through the bed 19. The interconnecting shafts 23 extend under the mounting member 2, and the test unit 1 supported at the test position.

The first gear unit 20 is placed between the drive motor 5 and the mounting member 2. The driving shaft 21 passes through the first gear unit 20. The first and second gear units 20 and 22 are arranged so that they can be connected with output shafts at two different positions. In one type of transaxles, the output shafts 6 are located as shown in solid lines in FIG. 1A and connected with the gear units 20 and 22 through the torque meters 7 as shown in solid lines in FIG. 1A. In the case of transaxles of the type having the input shaft on the opposite side, the output shafts 6 and the torque meters 7 are connected with the gear units 20 and 22 as shown in two dot chain lines in FIG. 1A.

As shown in FIG. 2, the first gear unit 20 has a through hole 24 through which the driving shaft 21 passes. The first gear unit 20 further includes first and second input members for receiving torque from the first output shaft 6 of the power train assembly 1, and a connecting gearing for transmitting rotation from the input members to the interconnecting shafts 23. The first and second input members are separate rotating members whose axes are parallel to each other in this example. The first and second input members of this example are first and second input gears 25 and 26, and the connecting gearing includes first and second idler gears 27 and 28, and first and second connecting gears 29 and 30. The first output shaft 6 is connected with the input gear 25 or 26 through one torque meter 7. The first and second connecting gears 29 and 30 are connected with the first and second interconnecting shafts 23, respectively. For example, the first connecting gear 29 is connected with one end of the first interconnecting shaft 23 coaxially so that rotation is prevented therebetween. The first idler gear 27 is disposed between the first input gear 25 and the first connecting gear 29. The first idler gear 27 is in direct engagement with each of the first input gear 25 and the first connecting gear 29. Similarly, the second idler gear 28 is geared between the second input gear 26 and the second connecting gear 30.

These gears are enclosed in a casing having two opposite walls each of which is formed with the through hole 24 through which the driving shaft 21 passes.

Figure 3A:
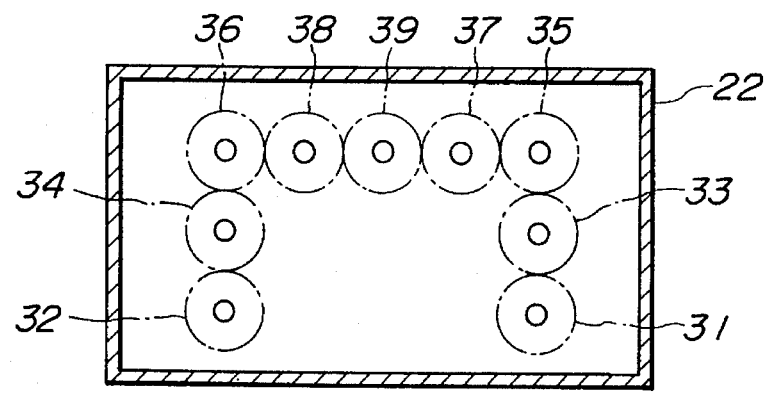
FIG. 3A is a vertical sectional front view of a second gear unit used in the test system shown in FIGS. 1A and 1B.
Figure 3B:
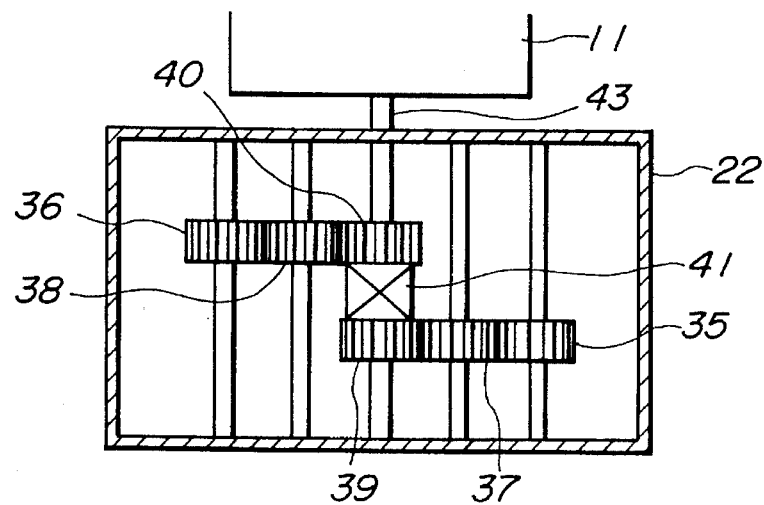
FIG. 3B is a cutaway plan view of the second gear unit shown in FIG. 3A.

As shown in FIGS. 3A and 3B, the second gear unit 22 includes first and second connecting gears 32 and 31 which are connected, respectively, with the first and second connecting gears 29 and 30 by the first and second interconnecting shafts 23; first and second input gears 36 and 35 for receiving torque from the test unit 1; first and second output gears 40 and 39 for delivering torque to the dynamometer 11; and a clutch 41 for connecting one of the first and second output gears 40 and 39 to the dynamometer 11. The first connecting gear 32 is geared with the first input gear 36 by an idler gear 34, and the second connecting gear 31 is geared with the second input gear 35 by an idler gear 33. The first output gear 40 is geared with the first input gear 36 by an idler gear 38. The second output gear 39 is geared with the second input gear 35 by an idler gear 38. The first and second output gear 40 and 39 of this example are rotatably mounted one behind the other on a common driven shaft 43, as shown in FIG. 3B. The clutch 41 connects either the first output gear 40 or the second output gear 39 with the common driven shaft 43 so that rotation relative to the common driven shaft is prevented. The common driven shaft 43 is connected with the dynamometer 11. In this example, the first and second input gears 32 and 31 are input members of the second gear unit 22, the gears 31–34 constitute a connecting gearing, and the gears 37–40 constitute an output gearing.

In this example, the driving shaft 21 and the common driven shaft 43 are substantially aligned in a horizontal line lying in an imaginary vertical center plane (shown by a one dot chain line C—C in FIG. 1A). As viewed in FIG. 2 or 3A, the gears in each of the first and second gear units 20 and 22 of this example are arranged in a manner of bilateral symmetry with respect to a predetermined imaginary median plane which, in this example, is substantially coincident with the imaginary center plane. The first and second interconnecting shafts 23 of this example are substantially parallel to the imaginary center plane, equidistant from the imaginary center plane, and symmetrical with respect to the imaginary center plane. The axes of the output shafts 6 of the power train assembly 1 of this example are aligned in a horizontal line lying in a first imaginary vertical plane in which the axis of one of the first and second interconnecting shafts 23 extends horizontally.

In the example shown in FIGS. 1A and 1B, the gear units 20 and 22 have a substantially equal width measured along the widthwise direction perpendicular to the imaginary center plane C—C. The width of the gear units 20 and 22 is smaller than the width of the drive motor 5, and smaller than the width of the dynamometer 11. The distance between the two parallel interconnecting shafts 23 is smaller than the width of the gear units 20 and 22.

In the example shown in FIGS. 1A and 1B, the output shafts 6 and the interconnecting shafts 23 extend horizontally. In the first gear unit 20 shown in FIG. 2, the axes of the first and second input gears 25 and 26 are coplanar, and lie in an imaginary single upper horizontal plane. Similarly, the axes of the connecting gears 29 and 30 are coplanar, and lie in an imaginary lower horizontal plane. In the second gear unit 22, the axes of the input gears 35 and 36 are coplanar, and lie in an imaginary upper horizontal plane, and the axes of the connecting gears 31 and 32 lie in an imaginary lower horizontal plane. The distance between these upper and lower imaginary horizontal planes of the first gear unit 20 is equal to the distance between the upper and lower horizontal planes of the second gear unit 22. The gear 25, 27 and 29 of the first gear unit 20 are identical in gear size to the gears 35, 33 and 31, respectively. As mentioned before, the gears 25, 27 and 29 and the gears 26, 28 and 30 are arranged symmetrically in the manner of bilateral symmetry. The gears of the second gear unit 22 are also arranged symmetrically.

The thus-constructed test system is operated as follows: Rotation from the drive motor 5 is inputted through the driving shaft 21 passing through the first gear unit 20, and the first torque meter 3, to the power train assembly 1 to be tested. Output rotation from the power train assembly 1 is transmitted through the output shafts 6 and the second and third torque meters 7 to the first and second gear units 20 and 22. In the first gear unit 20, the rotation from the first output shaft 6 is transmitted from the first input gear 25 through the idler gear 27 to the first connecting gear 29. Then, the rotation of the first connecting gear 29 is transmitted through the first interconnecting shaft 23 to the first connecting gear 32 of the second gear unit 22. In the second gear unit 22, the rotation from the second output shaft 6 and the third torque meter 7 is transmitted to the first input gear 36. Therefore, the rotation transmitted from the output shaft 6 to the first input gear 36 and the rotation transmitted from first gear unit 20 through the interconnecting shaft 23 to the first connecting gear 32 join together, and the combined rotation is further transmitted through the gears 38 and 40 and the clutch 41 to the dynamometer 11.

Figure 4:
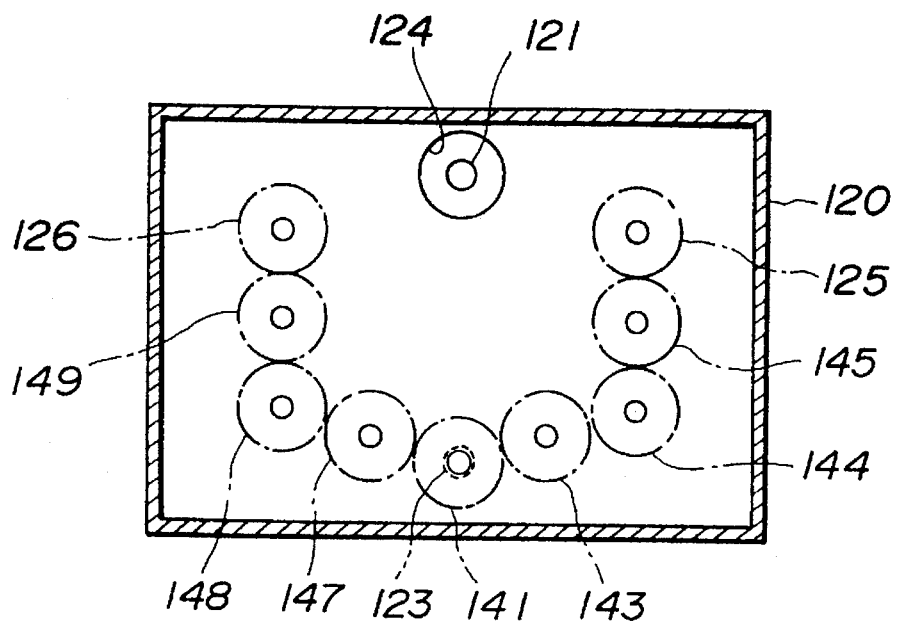
FIG. 4 is a vertical sectional front view showing a first gear unit used in a test system according to a second embodiment of the present invention.
Figure 5:
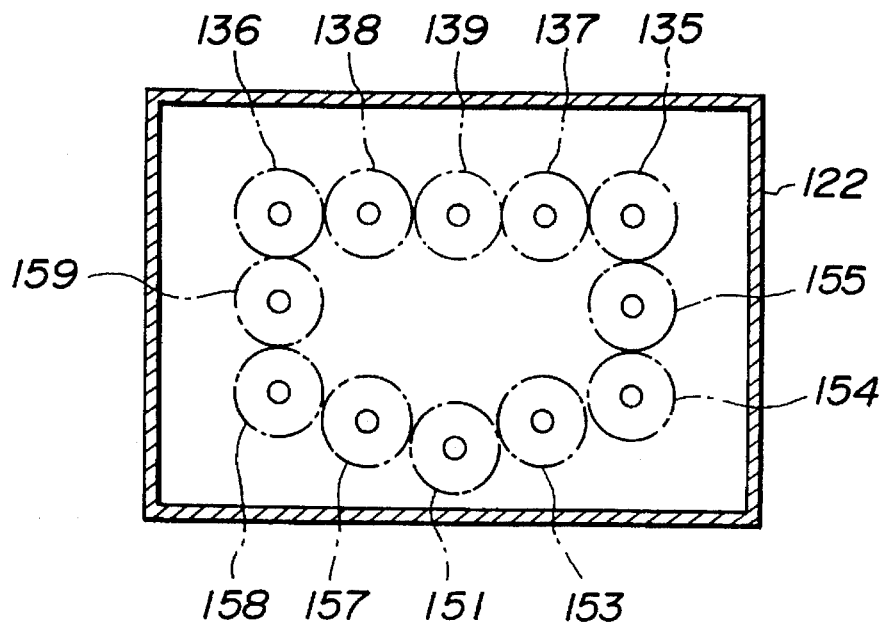
FIG. 5 is a vertical sectional front view showing a second gear unit used in the test system according to the second embodiment.
Figure 6:
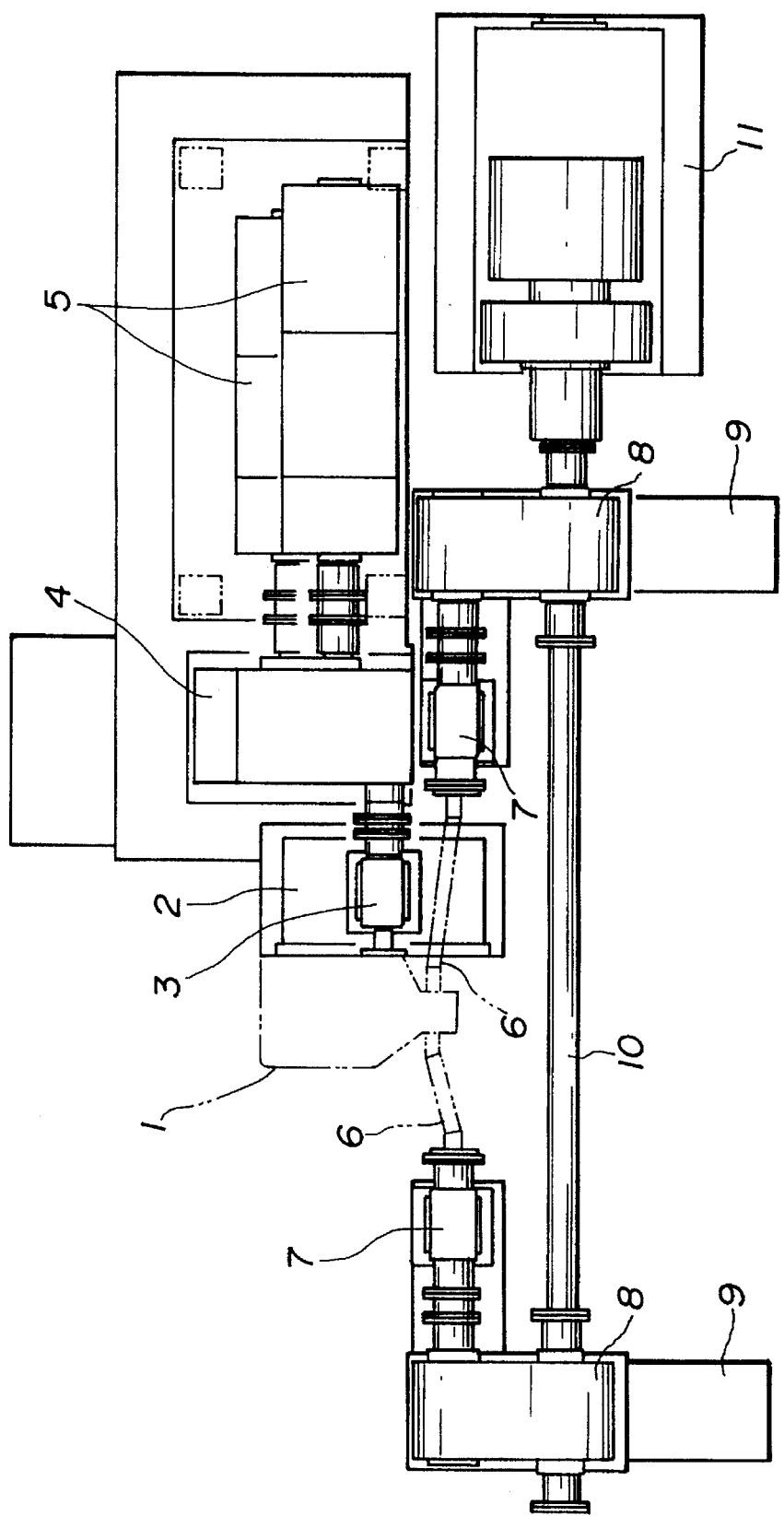
FIG. 6 is a plane view showing a first conventional test system.
Figure 8A:
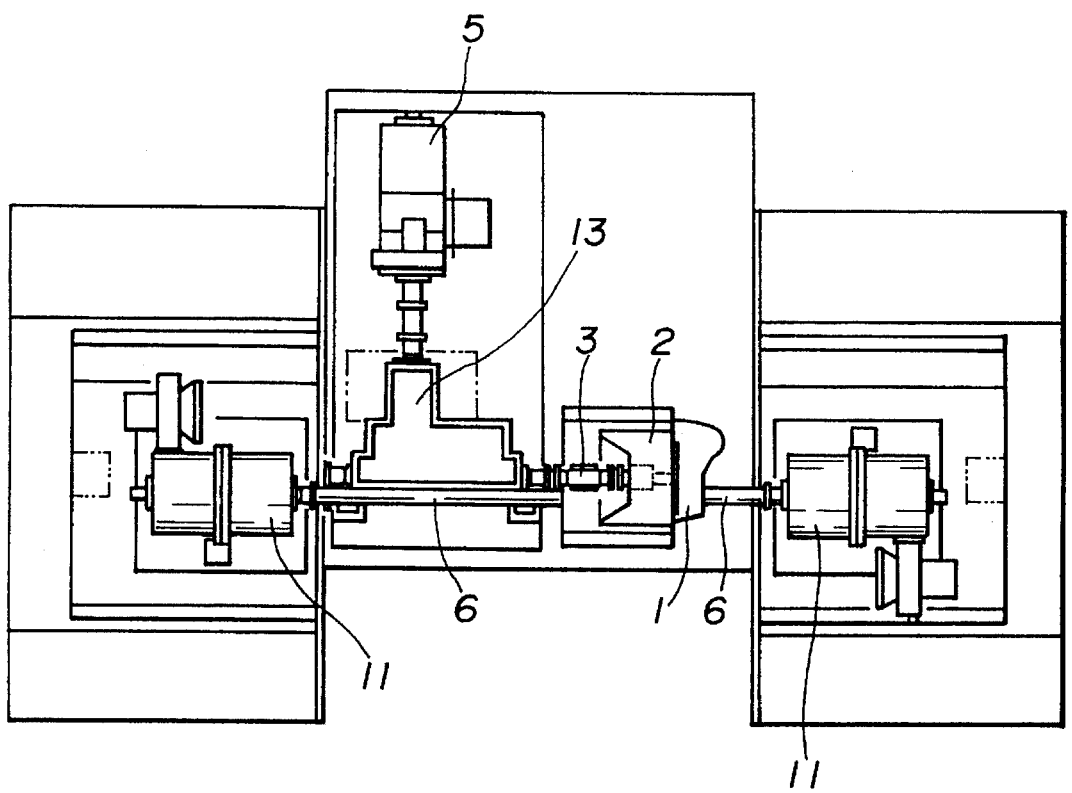
FIGS. 8A and 8B are plan and front views showing a third conventional test system.
Figure 8B:
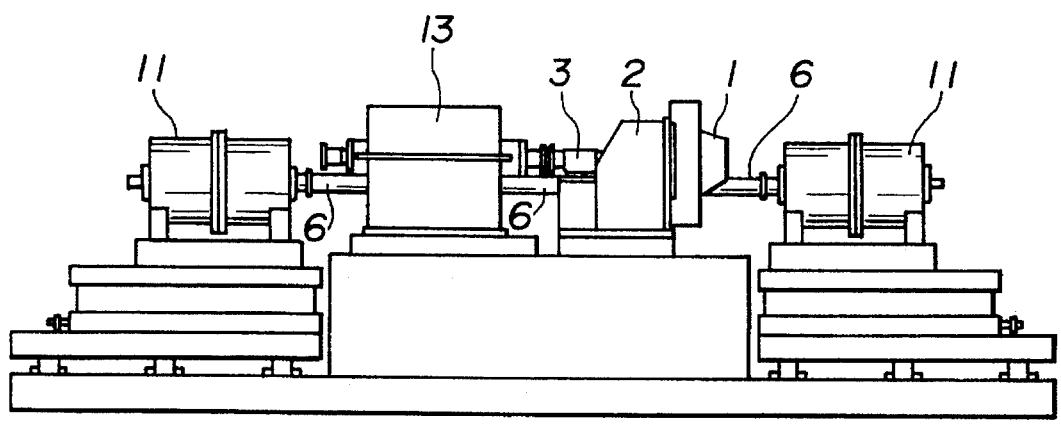
Figure 9:
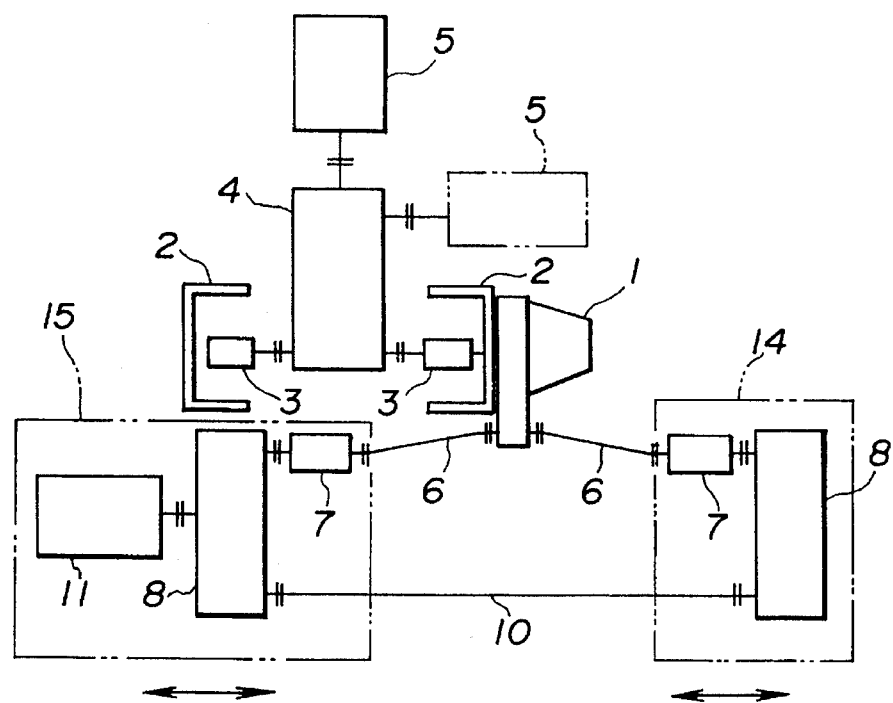
FIG. 9 is a plan view showing a fourth conventional test system.
Figure 10:
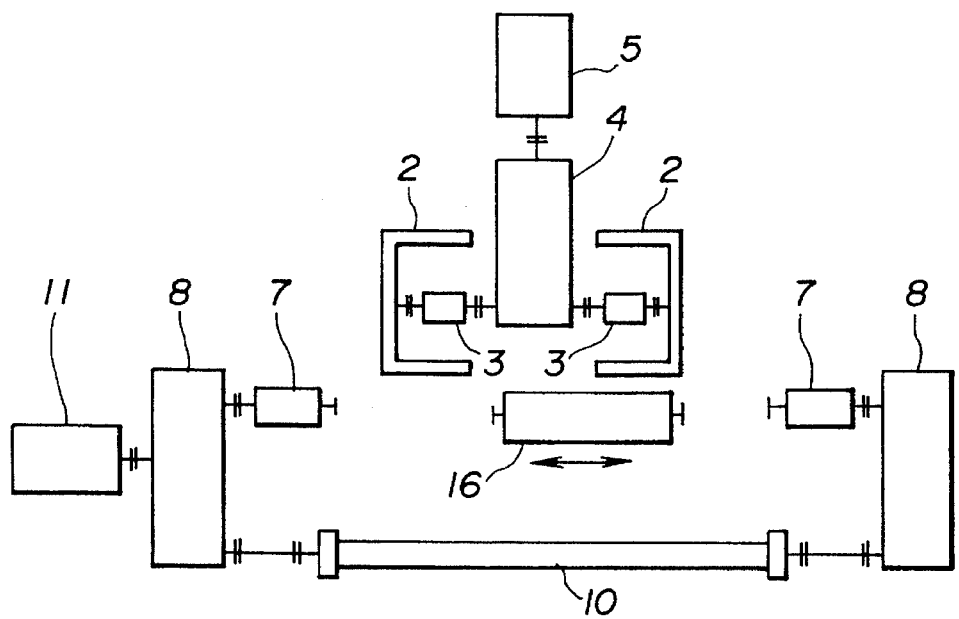
FIG. 10 is a plan view showing a fifth conventional test system.
Figure 11:
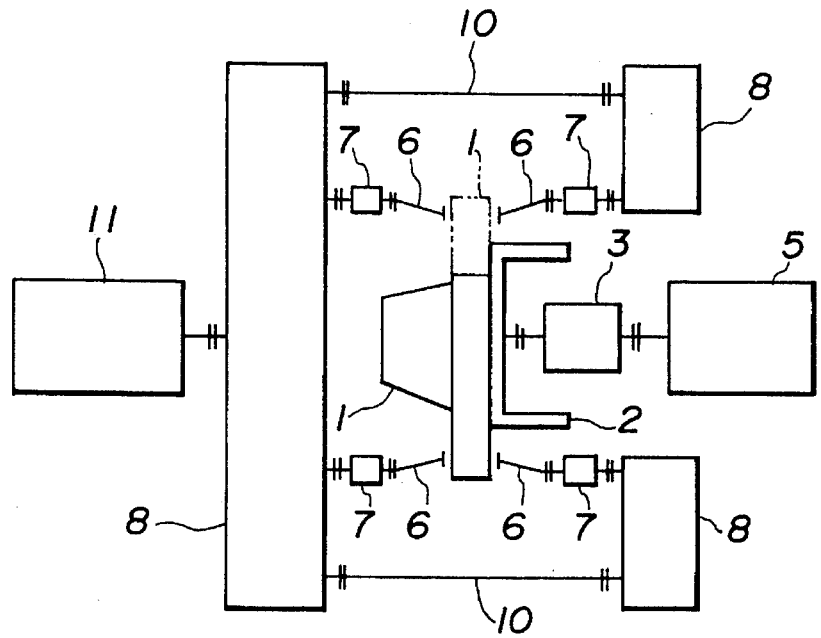
FIG. 11 is a plan view showing a sixth conventional test system.
Figure 12:
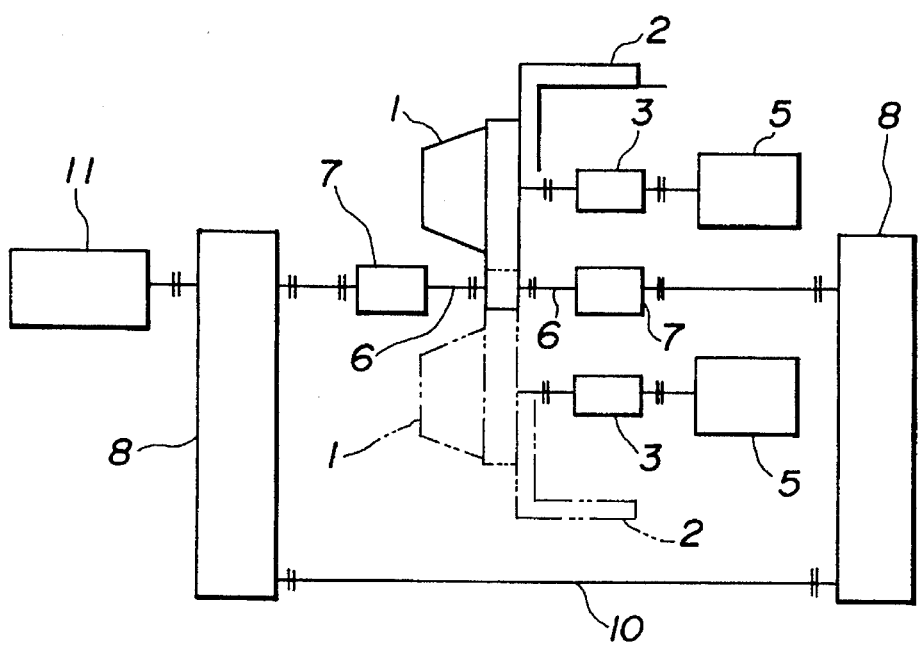
FIG. 12 is a plan view showing a seventh conventional test system.

FIGS. 4 and 5 show a second embodiment according to the present invention. The test system of the second embodiment is different from that of the first embodiment only in the following points. The test system of the second embodiment has only one interconnecting shaft 123, and the first and second gear units 120 and 122 are arranged as shown in FIGS. 4 and 5.

In the example shown in FIG. 4, the first gear unit 120 includes first and second input members which are first and second input gears 125 and 126, and a connecting gearing which includes a common connecting gear 141 and first and second intermediate gearings. The common connecting gear 141 is connected with one end of the common interconnecting shaft 123. The common connecting gear 141 is connected with the first input gear 125 by the first intermediate gearing which, in this example, includes a train of three intermediate gears 143, 144 and 145. The common connecting gear 141 is further connected with the second input gear 126 by the second intermediate gearing which, in this example, includes a train of three intermediate gears 147, 148 and 149. The first gear unit 120 has a casing formed with through holes 124 through which a driving shaft 121 passes, as in the first embodiment.

As shown in FIG. 5, the second gear unit 122 has first and second input members which, in this example, are first and second input gears 136 and 135, a connecting gearing and an output gearing 137, 138 and 139. The connecting gearing of the second gear unit 122 includes a common connecting gear 151 which is connected with the first input gear 136 by a first intermediate gear train 157, 158 and 159, and which is further connected with the second input gear 135 by a second intermediate gear train 153, 154 and 155.

The arrangement of the clutch 41 between the gears 39 and 40 shown in FIG. 3B can be employed for each of the gears 141, 151 and 139. For example, the gear 141 can be replaced by an arrangement including a first gear geared with the gear 143 and rotatable on a common shaft, a second gear geared with the gear 147 and ratable on the common shaft, and a clutch for connecting one of the first and second gears with the common shaft. When these clutches are employed, and the output shafts 6 are connected with the first input gears 125 and 136 of the first and second gear units 120 and 122, then the second input gears 126 and 135 and the second intermediate gear trains 147–149 and 153–155 can be disconnected from the other gears driven by the torque from the drive motor 5.

In the examples shown in FIGS. 4 and 5, the axes of the gears 125 and 126 are coplanar, and lie in a single imaginary upper horizontal plane, and the axis of the gear 141 is parallel to the this upper horizontal plane. Similarly, the axes of the gears 135 and 136 are coplanar and lie in a single imaginary upper horizontal plane, and the axis of the gear 151 is parallel to this upper horizontal plane. The distance between the imaginary upper horizontal plane of the first gear unit 120 and the axis of the gear 141 is equal to the distance between the upper imaginary horizontal plane of the second gear unit 122 and the axis of the gear 151.

In the test systems according to the first and second embodiments of the present invention, as explained above, the single first gear unit 20 or 120 is placed on the driving side (motor's side) of the test unit 1, and the single second gear unit 22 or 122 is placed on the absorbing side (dynamometer's side) of the test unit. The driving shaft 21 or 121 passes through the first gear unit 20 or 120, and the interconnecting shaft or shafts 123 or 23 are placed under the floor surface 18. These test systems, therefore, are compact, and occupy only a small space. The angle of the output shafts 6 of the test unit 1 is small, and advantageous in the inertia. The test systems according to the invention make it easier to test a drive train assembly at high speeds. The test systems are readily applicable to both of the drive train assembly having the input member on the right side, and the drive train assembly having the input member on the left side.

What is claimed is:

1. A power train test system for testing a vehicular power train assembly comprising an input member and a first output member which are located on one side of the assembly, and a second output member located on the other side of the assembly, the test system comprising:

a drive motor for supplying a driving torque to the power train assembly;

a driving shaft for transmitting the driving torque from the drive motor to the input member of the power train assembly;

a first interconnecting shaft;

a dynamometer for receiving a torque from the drive motor through the power train assembly;

a first gear unit for receiving a torque from the first output member of the power train assembly through one of first and second input members of the first gear unit, and a second gear unit for receiving a torque from the second output member of the power train assembly through one of first and second input members of the second gear unit, the first and second gear units being connected with each other by the first interconnecting shaft, the second gear unit being connected with the dynamometer, the driving shaft passing through the first gear unit; and a mounting member for supporting the power train assembly at a predetermined test position in the test system, the test position being located between the first and second gear units, and the first gear unit being placed between the test position and the drive motor.

2. A power train test system according to claim 1 wherein the second gear unit is placed between the mounting member and the dynamometer; and the first interconnecting shaft extends under the test position.

3. A power train test system according to claim 2 wherein the first interconnecting shaft extends under the mounting member and the power train assembly supported at the test position by the mounting member.

4. A power train test system according to claim 2 wherein the test system further comprises a support structure defining a first surface on which the mounting member is placed, and a second surface on which the first and second gear units are placed; the second surface is depressed below the first surface; the power train assembly is placed above the first surface; and the first interconnecting shaft extends below the first surface.

5. A power train test system according to claim 4 wherein the first gear unit comprises the first and second input members which are first and second input gears and a connecting gearing for transmitting rotation between the first interconnecting shaft and one of the first and second input gears; the second gear unit comprises the first and second input members which are first and second input gears, and a connecting gearing for transmitting rotation between the first interconnecting shaft and one of the first and second input gears of the second gear unit; and the second gear unit further comprises an output gearing for transmitting rotation from one of the first and second input gears of the second gear unit to the dynamometer, and wherein the first gear unit comprises a casing which encloses the first and second input gears and the connecting gearing of the first gear unit, and which is formed with a through hole through which the driving shaft passes.

6. A power train test system according to claim 5 wherein the first and second input gears of the first gear unit are substantially parallel to the driving shaft; the first input gear of the first gear unit is located on one side of the driving shaft within the casing; and the second input gear of the first gear unit is located on the other side of the driving shaft within the casing;

wherein the input member and the first and second output members of the power train assembly are, respectively, an input shaft and first and second output shafts, and the input shaft is substantially parallel to each of the first and second output shafts of the power train assembly; and wherein the driving shaft is connected with the input shaft of the power train assembly through a first coupling means comprising a first torque meter, the first output shaft of the power train assembly is connected with the first gear unit thorough a second coupling means comprising a second torque meter, and the second output shaft is connected with the second gear unit thorough a third coupling means comprising a third torque meter.

7. A power train test system according to claim 6 wherein the second gear unit is connected with the dynamometer by a driven shaft; the first and second input gears of the second gear unit are substantially parallel to the driven shaft; the first input gear of the second gear unit is on one side of the driven shaft; and the second input gear of the second gear unit is located on the other side of the driven shaft; and wherein the output gearing of the second gear unit comprises a first output gear which is mounted on the driven shaft and geared with the first input gear of the second gear unit by an idler gear, and a second output gear which is mounted on the driven shaft and geared with the second input gear of the second gear unit by an idler gear.

8. A power train test system according to claim 7 wherein both of the first and second output gears of the second gear unit are rotatably mounted on the driven shaft, and the second gear unit further comprises a clutch for preventing rotation of one of the first and second output gears relative to the driven shaft and allowing rotation of the other of the first and second output gears relative to the driven shaft.

9. A power train test system according to claim 8 wherein the test system further comprises a second interconnecting shaft; the connecting gearing of the first gear unit comprises a first connecting gear geared with the first input gear of the first gear unit, and a second connecting gear geared with the second input gear of the first gear unit; and the connecting gearing of the second gear unit comprises a first connecting gear which is connected with the first connecting gear of the first gear unit by the first interconnecting shaft and which is geared with the first input gear of the second gear unit, and a second connecting gear which is connected with the second connecting gear of the first gear unit by the second interconnecting shaft and which is geared with the second input gear of the second gear unit.

10. A power train test system according to claim 9 wherein the axes of the first and second output shafts of the power train assembly are aligned in a first imaginary vertical plane, and the axis of the first interconnecting shaft extends substantially in parallel to the axes of the first and second output shafts in the first imaginary vertical plane.

11. A power train test system according to claim 10 wherein the first and second connecting gears of each of the first and second gear units are symmetrical with respect to an imaginary center vertical plane, and the first and second interconnecting shafts are parallel to, and equidistant from, the imaginary center vertical plane.

12. A power train test system according to claim 11 wherein a width of each of the first and second gear units measured along a direction perpendicular to the imaginary center plane is smaller than a width of the drive motor and smaller than a width of the dynamometer, and a distance between the first and second interconnecting shafts is smaller than the width of the first gear unit and smaller than the width of the second gear unit.

13. A power train test system according to claim 8 wherein the connecting gearing of the first gear unit comprising a common connecting gear which is geared with the first input gear of the first gear unit by a first intermediate gear train, and which is further geared with the second input gear of the first gear unit by a second intermediate gear train; and the connecting gearing of the second gear unit comprising a common connecting gear which is geared with the first input gear of the second gear unit by a first intermediate gear train, which is further geared with the second input gear of the second gear unit by a second intermediate gear train, and which is connected with the common connecting gear of the first gear unit by the interconnecting shaft.

14. A power train test system according to claim 13 wherein both of the axis of the common connecting gear of the first gear unit and the axis of the through hole of the first gear unit lie in an imaginary vertical median plane of the first gear unit; the gears of the first gear unit are arranged symmetrically with respect to the median plane of the first gear unit; both of the axis of the common connecting gear of the second gear unit and the axis of the driven shaft lie in an imaginary vertical median plane of the second gear unit; and the gears of the second gear unit are arranged symmetrically with respect to the median plane of the second gear unit.

15. A power train test system according to claim 14 wherein each of the first and second intermediate gear trains of the first gear unit and the first and second intermediate gear trains of the second gear unit includes a train of three intermediate gears.

16. A power train test system according to claim 8 wherein the support structure comprises a depression which is depressed below the first surface, and which has a bottom defining the second surface, and a bed which is placed on the bottom of the depression between the first and second gear units and which has a top surface on which the mounting member is placed; and the interconnecting shaft passes through the bed.

17. A power train test system according to claim 16 wherein the dynamometer is placed on the first surface defined by the support structure, the drive motor is placed on the bottom of the depression, and the driving shaft and driven shaft are aligned, and wherein the power train assembly is a transaxle.

* * * * *